L. KINDLING.
SANDING WAGON.
APPLICATION FILED JAN. 15, 1915.

1,231,269.

Patented June 26, 1917.
2 SHEETS—SHEET 1.

WITNESSES.

INVENTOR.
Louis Kindling.
By R. C. Caldwell
ATTORNEY.

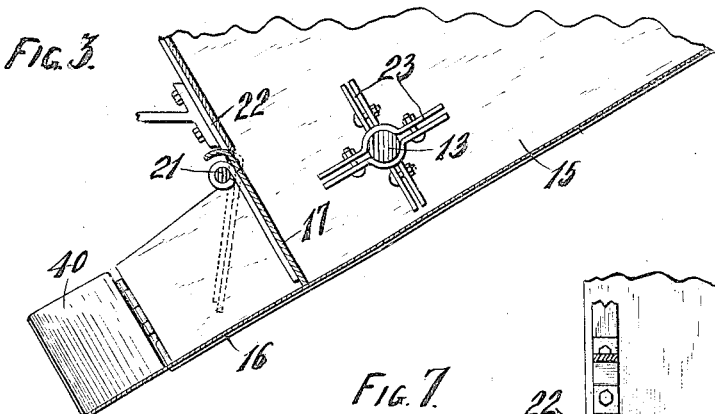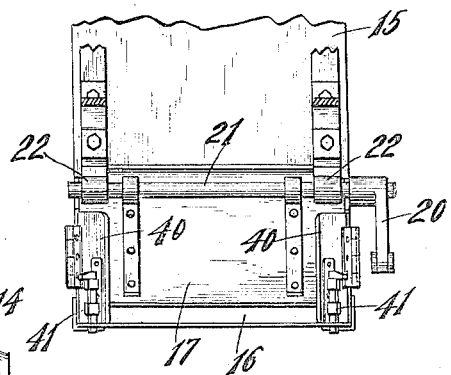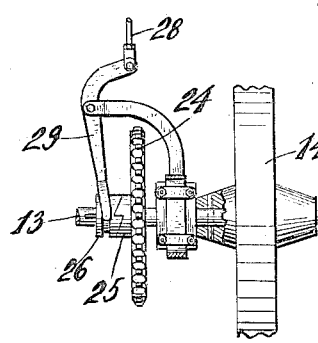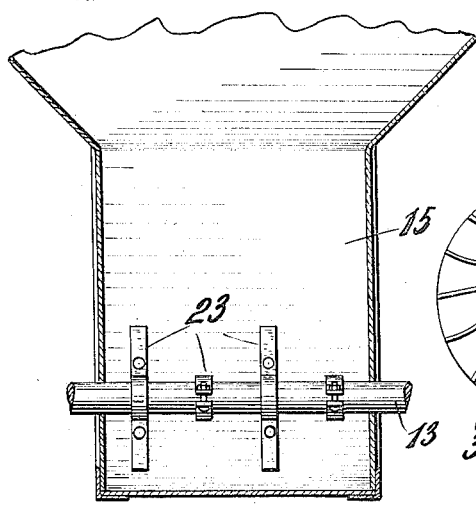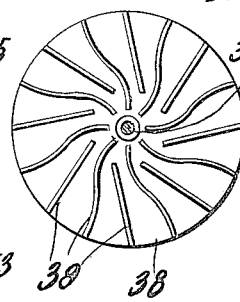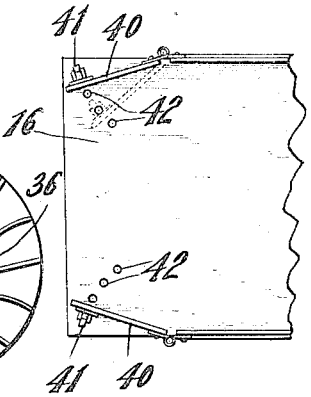

UNITED STATES PATENT OFFICE.

LOUIS KINDLING, OF MILWAUKEE, WISCONSIN.

SANDING-WAGON.

1,231,269.  Specification of Letters Patent.  Patented June 26, 1917.

Application filed January 15, 1915. Serial No. 2,339.

*To all whom it may concern:*

Be it known that I, LOUIS KINDLING, a citizen of the United States, and resident of Milwaukee, in the county of Milwaukee and State of Wisconsin, have invented new and useful Improvements in Sanding-Wagons, of which the following is a description, reference being had to the accompanying drawings, which are a part of this specification.

This invention has for its object to provide a wagon for scattering sand over the surface of roads or streets immediately after oiling them to permit of their being more quickly available for use, or for sprinkling sand over slippery ice coated pavements to reduce the danger thereof.

A particular object of the invention is to enable its use with sand which is damp and therefore liable to cake and interfere with the discharge through the discharge opening.

With the above objects in view the invention comprises a sanding wagon having its rear axle fixed to one of the rear wheels so as to turn therewith and passing through the lower portion of the sand hopper just above the discharge opening, with agitator arms fixed thereon to work the sand loose and maintain its feed through the discharge opening from which it is led by a spout having adjustable side gates to a rapidly rotating distributer driven from the rear axle through a clutch mechanism controlled from the driver's seat, there being also a gate for controlling the passage through the discharge opening and controlled from the driver's seat.

With the above and other objects in view the invention consists in the sanding wagon as herein claimed and all equivalents.

Referring to the accompanying drawings in which like characters of reference indicate the same parts in the different views:

Fig. 3 is a sectional detail view of the lower end of the sand hopper and its discharge spout and showing the controlling gate in its closed position;

Fig. 4 is a view looking up the discharge spout and showing the controlling gate in a partially open position;

Fig. 5 is a vertical sectional view through the lower portion of the sand hopper on the plane of the axle;

Fig. 6 is a plan view showing the adjustable side gates of the discharge spout;

Fig. 7 is a view showing the clutch; and,

Fig. 8 is a plan view of the rotary distributer.

Figure 1:
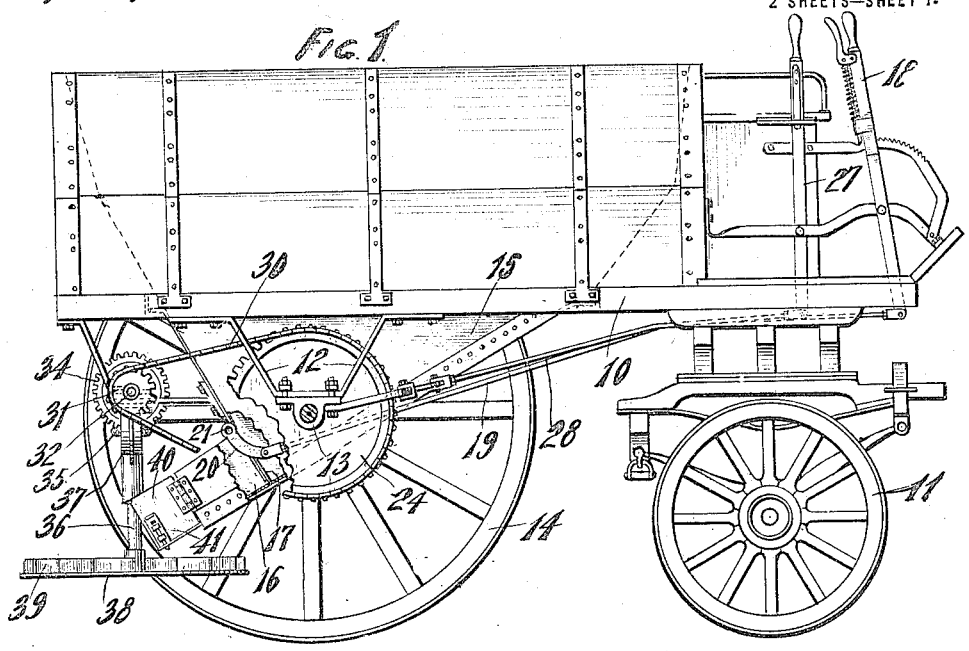
Figure 1 is a side elevation, with parts broken away, of a sanding wagon constructed in accordance with this invention.
Figure 2:
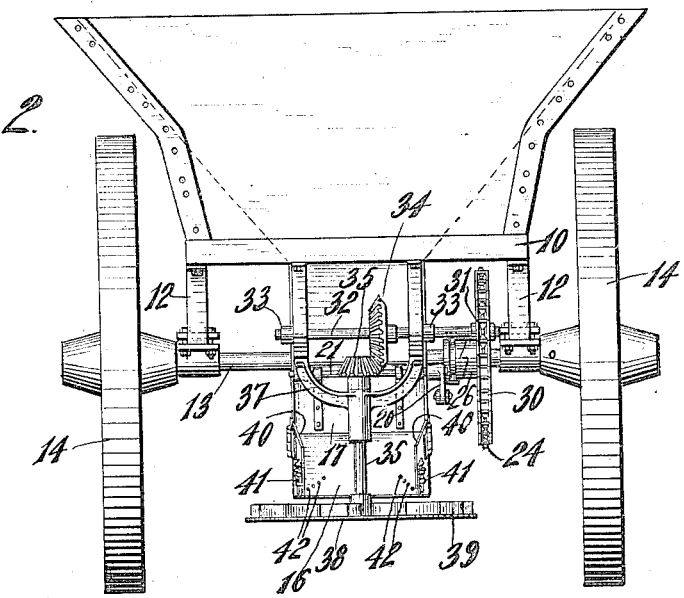
Fig. 2 is a rear view thereof.

In these drawings 10 indicates a wagon body mounted on a yielding front truck as usual, but having unyielding or rigid bearings 12 in which its rear axle 13 turns, being keyed or otherwise rigidly secured to one of the rear wheels 14, while the other rear wheel turns loosely thereon. Practically the entire body of the wagon is occupied by a sand hopper 15, preferably of sheet metal construction, with its lower portion having vertical side walls through which the axle 13 passes, and a continuation of the inclined bottom of this portion of the hopper forms a rearwardly and downwardly projecting discharge spout 16 leading from a discharge opening which is controlled by a swinging gate 17 operated from the driver's seat through a lever 18 having a connecting rod 19 connected with a crank arm 20 on the rod 21 by which said discharge gate is pivotally mounted in bearings 22 on the rear of the sand hopper. To that portion of the rear axle 13 which lies within the lower portion of the sand hopper are secured agitator arms 23, preferably consisting of metal strips bent around the axle and bolted together in pairs as shown in Fig. 3. The turning of the rear axle incident to the travel of the wagon causes the agitator arms to rotate and stir the sand in the bottom of the hopper just in advance of the discharge opening so as to prevent the sand when moist from caking and clogging the discharge opening.

A sprocket wheel 24 is loosely mounted on the rear axle 13 and is provided with clutch teeth 25 to be engaged by corresponding teeth on a clutch member 26 which is splined on the axle and which may be thrown into and out of driving engagement with the sprocket wheel from the driver's seat by means of a lever 27 connected by a rod 28 with a bell crank lever 29 having a yoke engagement with a groove of the clutch member 26. A chain 30 connects sprocket wheel 24 with a smaller sprocket wheel 31 on a shaft 32 which is journaled in bearings 33 at the rear of the sand hopper, and a beveled gear 34 on said shaft 32 meshes with a beveled pinion 25 on a vertical shaft 36 which is supported by a yoke bearing 37 so that when the clutch is engaged said shaft 36 is driven at a relatively high speed. At the lower end of shaft 36 is a sand distributer comprising a metal disk 38 with curved upstanding ribs 39 on its upper surface radiating from the center, the center of the distributer disk being positioned in the path of discharge of sand from the discharge spout 16, and the rapid rotations of said distributer serving to throw the sand by centrifugal force from between the curved ribs thereof and effect a wide and even distribution of the sand.

Hinged to the sides of the discharge spout 16 are side gates 40 which may be swung near together or far apart and locked in such adjustments by sliding bolts 41 thereon fitting in openings 42 in the bottom of the spout so as to vary the effective passageway through the spout according to whether the sand is dry or damp.

In operation the forward travel of the sanding wagon causes the turning of the rear axle 13 and consequently the turning of the agitator arms 23 thereon to stir up the sand in the bottom of the hopper and keep it in a loose, broken condition for ready exit through the discharge opening, and with the gate 17 open to the desired extent to regulate the flow of sand therethrough the sand will be delivered regularly to the inclined spout 16 from which it flows through the regulated opening between the side gates 40 and is dropped upon the center of the rapidly rotating distributer 38 and is scattered broadcast thereby to produce an even layer of sand on the surface of the road or street. The rear end of the wagon being without springs there is sufficient jarring motion imparted to the sand hopper to keep the contents from adhering to the walls thereof even though it may be in a wet or moist condition, and the rotating agitator arms on the rear axle assure the discharge of the sand in a regular flow through the discharge spout. The driver may readily control the conditions both as to the degree of opening of the discharge gate 17 and as to the operation of the distributer, being able to adjust the former by means of the lever 18 and to effect the engagement or disengagement of the clutch by means of lever 27. With dry sand having a tendency to flow freely the side gates 40 may be closed more or less to restrict the flow from the discharge spout, while with wet sand having a tendency to resist flowing action the side gates may be opened to avoid interference therewith.

What I claim as new and desire to secure by Letters Patent is:

1. In a sanding wagon, a sand hopper, a discharge spout leading therefrom, means for controlling the flow of sand through the discharge spout, adjustable side gates on the discharge spout for varying the effective passageway therethrough, and a suitably driven rotary sand distributer receiving the sand from the discharge spout.

2. In a sanding wagon, a sand hopper, bearings unyieldingly mounted thereon, an axle journaled in the bearings and passing through the lower part of the sand hopper, wheels on the axle, one of which is fixed thereto, an agitating arm on the axle within the sand hopper, there being a discharge opening in the sand hopper near the agitating arm, a swinging gate for closing the discharge opening more or less, a lever having connection with the swinging gate for controlling the position thereof, a discharge spout leading from the discharge opening, adjustable side gates on the discharge spout for varying the effective passageway therebetween, a rotary sand distributer receiving sand from the discharge spout, a sprocket wheel loosely mounted on the axle and having driving connection with the sand distributer, a clutch member splined on the axle and capable of engagement with the sprocket wheel, and a lever having a connection with the clutch member for controlling the driving operation of the sand distributer.

3. In a sanding wagon, a sand hopper, an axle journaled thereon and passing through the lower part of the sand hopper, wheels on the axle, one of which is fixed thereto, agitating arms on the axle within the sand hopper, there being a discharge opening in the sand hopper near the agitating arms, a swinging gate for closing the discharge opening more or less, a discharge spout leading from the discharge opening, adjustable side gates on the discharge spout for varying the effective passageway therebetween, and a rotary sand distributer receiving sand from the discharge spout and driven from the axle.

In testimony whereof I affix my signature, in presence of two witnesses.

LOUIS KINDLING.

Witnesses:
R. S. C. CALDWELL,
KATHERINE HOLT.